STEAM TRAP

INVENTOR.
WILLIAM J. GLEASON JR.
CARL W. ZIES
BY
Meyer, Baldwin, Doran & Egan
ATTORNEYS

STEAM TRAP

Filed Sept. 22, 1964

3 Sheets-Sheet 2

INVENTOR.
WILLIAM J. GLEASON JR.
CARL W. ZIES
BY
Meyer, Baldwin, Doran & Egan
ATTORNEYS

STEAM TRAP

Filed Sept. 22, 1964

INVENTOR.
WILLIAM J. GLEASON JR.
CARL W. ZIES
BY
Meyer, Baldwin, Doran & Egan
ATTORNEYS United States Patent Office 3,347,257

Patented Oct. 17, 1967

3,347,257
STEAM TRAP

William J. Gleason, Jr., and Carl W. Zies, Lakewood, Ohio, assignors to International Basic Economy Corporation, New York, N.Y., a corporation of New York Filed Sept. 22, 1964, Ser. No. 398,195
7 Claims. (Cl. 137—183)

Figure 1:
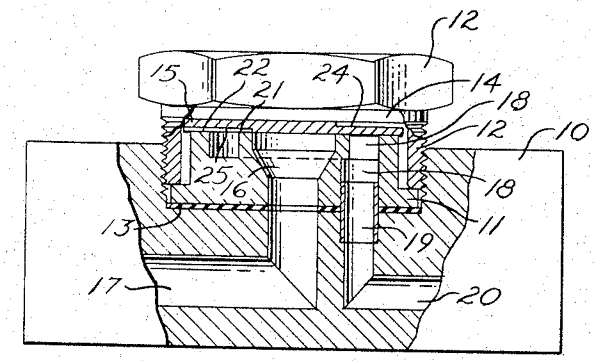

This invention relates to steam traps, and particularly to steam traps of the so-called "impulse" or "thermodynamic" type. This type of trap has as one of its impressive advantages the reduction of moving parts to a minimum thereby practically eliminating subsequent servicing or shut-downs.

As is known to those skilled in this art, the purpose of a steam trap is to vent air, or other inert gases, and condensate from a steam pressure system without losing any appreciable amount of steam. The most efficient trap is one which vents the maximum amount of air, inert gases, and condensate under varying conditions of pressure and temperature.

There are three general types of steam traps employed in present day use. One form commonly used is the so-called "bucket" trap having either an inverted or straight upright bucket. In traps of the straight upright bucket type, the system discharges steam through a bucket or chamber within the trap, and the valve for discharging air and condensate from the trap is controlled by the weight of the condensed steam within the bucket. Steam traps of the inverted bucket type are likewise operated by gravity, but in this case the steam inlet is at the bottom of the trap and within the inverted bucket. A small amount of vapor collects inside the inverted bucket causing it to rise and thereby close the trap outlet valve. Inert gas escapes from the bucket through small holes in the bucket wall and collects in the top of trap. When the vapor in the bucket cools and condenses, the bucket loses its buoyancy and sinks, thus opening the valve. Steam pressure then forces condensate out through the valve and carries with it the entrained inert gases. When live steam reenters the trap, the bucket is lifted and valve shut. Since the action of the bucket controls the valve position, there must be mechanical linkage between the two, subject to wear or damage, and requiring periodic service.

Another form of steam trap is the "thermostatic" or "expansion" trap containing a thermal element to which a valve is attached. When live steam enters the trap, the element physically moves shutting off the flow, and when condensate or inert gas enters the trap, the element again moves and the valve opens. Condensate and inert gases are pushed out by the pressure in the main system until steam once more enters the trap and the valve closes. Generally speaking, thermostatic traps are slow acting since rather large temperature differentials are required between the open and closed valve positions.

The type of steam trap here in question is the "impulse" or "thermodynamic" type. The operation of this type of device involves a careful balance of differing pressures acting upon the unit. Usually the chamber of the trap contains at an intermediate height therein a movable plug or disk only slightly smaller than the chamber. The plug or disk ordinarily rests upon a valve seat attached to or integral with the body of the trap. As the steam system is first turned on, cold condensate enters the trap and causes the disk to rise from its normal position thereby opening a passage between the inlet and discharge ports. As the condensate is drained through the trap to the discharge port, the system, under steam pressure, increases in temperature so that eventually very hot condensate is flowing to the trap. Very hot condensate in the space just below the disk flashes into vapor, which sweeps past the raised disk and upwardly around the disk periphery into the space immediately above the disk. The pressure here is lower than in the inlet line, but since the lower pressure acts upon the entire area of the top of the disk, while the inlet pressure pushes against the bottom of the disk only in the area just above the inlet port, the disk closes by downward movement upon the inlet and discharge ports. When the condensate cools, the balance is again disrupted and the relatively higher pressure upon the bottom of the disk lifts the disk. Condensate and inert gases are swept through the opening until steam or very hot condensate, which can vaporize rapidly once more enters the trap. The disk falls upon the seat, and the flow stops.

The design of the impulse or thermodynamic type trap must take into account a number of factors. It is quite usual for steam systems to contain a quantity of inert gases such as air. This air must continue to be removed from the system in order to allow the steam trap to operate successfully. Otherwise air will be entrapped in the steam system and prevent proper operation of the trap. Heretofore, vent arrangements have been provided in the disk portion of the valve to allow passage of inert gas from the inlet to the outlet of the steam trap, even with the disk directly on the valve seat. Unfortunately, since the vent channel must be fabricated prior to installation of the trap, the indiscriminate use of such vents usually results in insufficient venting of the system, and air locking, or too much venting of the system, and excessive steam leakage.

The thermodynamic type of steam trap consists of several pressure stages, and the relative pressure in each one of the stages cooperates in controlling the opening and closing of the valves. Condensate (hot or cold water) entering the steam trap when the valve is open will be drained from the system through the trap. As the temperature of the condensate approaches the saturation temperature, the condensate will begin to flash since the pressure in both the outlet port and the body of the trap is lower than the pressure in the inlet port to the trap. In impulse and thermodynamic type of traps heretofore available, the design of the inlet nozzle has permitted the flashing action of the condensate to prematurely close the valve, by lowering the total force under the valve disk below the total force above the disk. When the disk falls upon the valve seat there is still condensate in the steam system. The portion of the condensate in the chamber above the disk must cool and condense to water thereby reducing the pressure above the disk before the valve disk rises permitting the system to once again drain. The flow of condensate from the system, of course, is retarded by premature closing of the trap. It is highly desirable to keep the valve open until all of the air and initial condensate are removed from the system. After the air and initial condensate are removed, steam will flow into the trap and completely fill the chamber within the body. The presence of steam will increase the pressure within the upper chamber so that it approaches the pressure at the inlet. As the pressure within the upper chamber increases, the total force upon the disk is raised proportionally. When the total force upon the face of the disk, forming a portion of the upper chamber, exceeds the total force upon the face of the disk, opposite the inlet port, the disk drops onto the inlet port and the valve is closed.

In some cases steam traps, heretofore, have been constructed with various configurations or irregularities on the bottom side of the valve disk. The configurations are designed to create turbulence under the valve disk and prevent premature closing of the steam trap. Since the rate of flow of steam condensate through the trap will determine the turbulence of the fluid under the valve disk, this particular type of mechanism is not entirely successful because at low flow rates little turbulence is created.

The present invention, therefore, has as one object, the positive removal of an increased amount of inert or incondensible gases from the pressure system at a rate commensurate with the quantity of inert or incondensible gases existing in the particular system being handled.

Since the present design allows the fluid in the trap to control the valve action, a further object of this invention is to provide a trap with a quick acting positive sealing means substantially independent of the operating conditions of the system.

A further object of this invention is to efficiently remove condensate and/or inert gas from a pressure system comprised substantially of vapor and only a small portion of inert gas.

A further object of the present invention is to provide a trap requiring little or no servicing.

Another object of the invention is to provide a trap which is simple and economic to manufacture.

Figure 4:
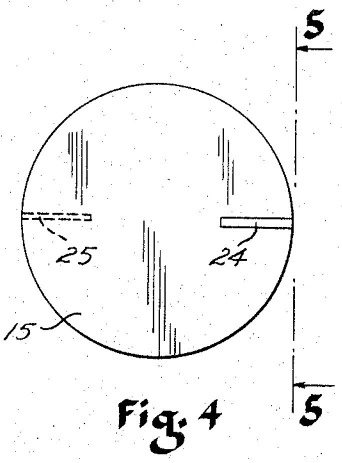
Figure 2:
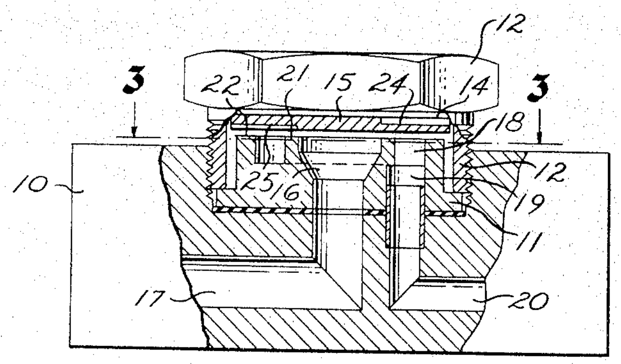
Figure 5:
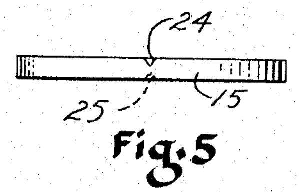
Figure 3:
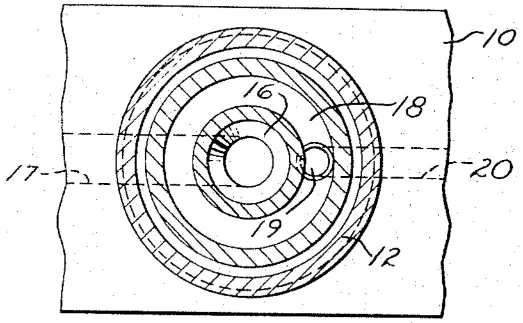
Figure 6:
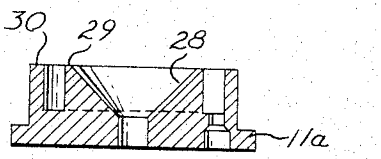
Figure 8:
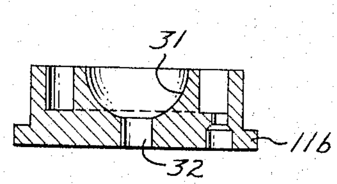
Figure 7:
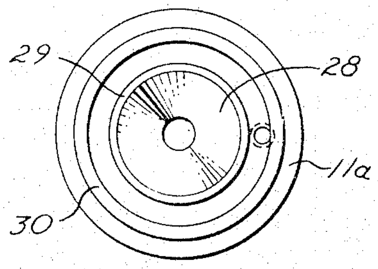
Figure 9:
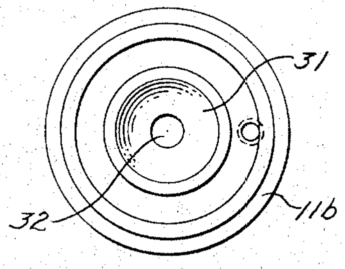
Figure 10:
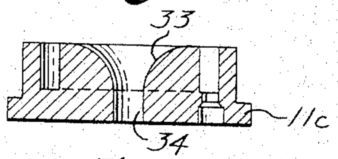
Figure 12:
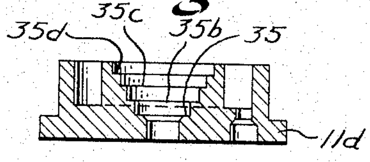
Figure 11:
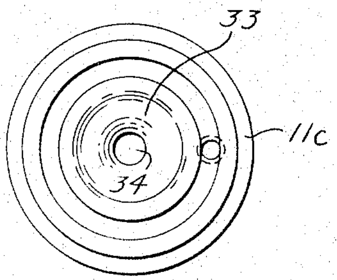
Figure 13:
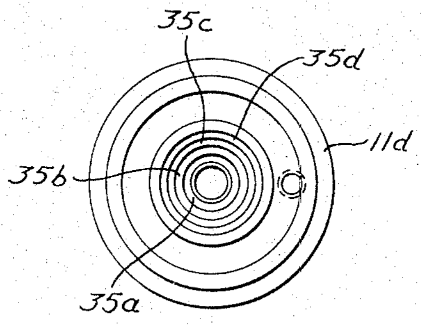
Figure 14:
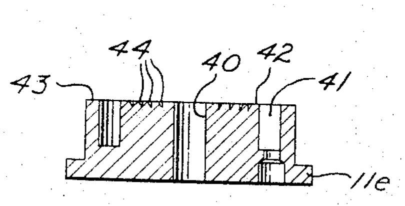
Figure 16:
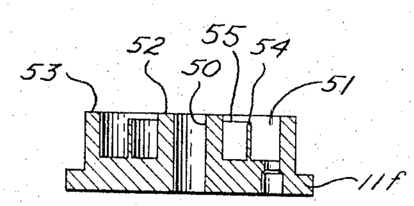
Figure 15:
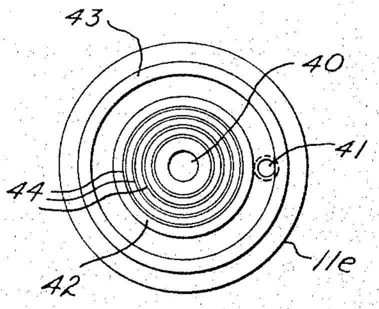
Figure 17:
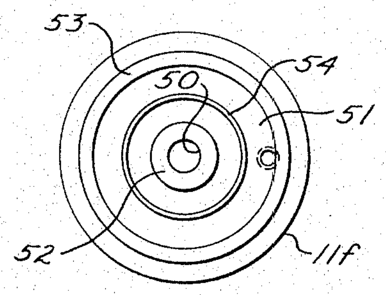

Other objects and advantages of the present invention will be apparent to those acquainted with the art upon study of the present specification together with the accompanying drawings, in which:

FIG. 1 is a vertical sectional view of a steam trap constructed in accordance with the present inventon, FIG. 2 is a view similar to FIG. 1 but with the movable valve disk in open position wherein condensate can flow from the inlet passage (left) to the outlet passage (right), FIG. 3 is a sectional view taken on the line 3—3 of FIG. 2, FIG. 4 is a top plan view of the movable valve disk, FIG. 5 is an edge view of the movable valve disk, FIG. 6 is a diametrical sectional view of another embodiment of valve seat member, FIG. 7 is a top plan view taken from above FIG. 6, FIG. 8 is a view similar to FIG. 6 but showing yet another embodiment of valve seat member, FIG. 9 is a top plan view taken from above FIG. 8, FIG. 10 is a view similar to FIGS. 6 and 8 but showing another embodiment of valve seat member, FIG. 11 is a top plan view taken from above FIG. 10, FIG. 12 is a view similar to FIGS. 6, 8 and 10 but showing another embodiment of valve seat member, FIG. 13 is a top plan view taken from above FIG. 12, FIG. 14 is a view similar to FIGS. 6, 8, 10 and 12 showing still another embodiment of valve seat member, FIG. 15 is a top plan view taken from above FIG. 14, FIG. 16 is a view similar to FIGS. 6, 8, 10, 12 and 14 showing yet another embodiment of valve seat member, FIG. 17 is a top plan view taken from above FIG. 16.

Referring now to the drawings, and for the time being to FIGS. 1 through 5, we show a main valve body 10 having a well or depression adapted to receive a valve seat portion 11 which is firmly fixed in the depression by a screw-threaded retaining cap 12. A gasket 13 is interposed between the valve seat portion 11 and the valve body 10.

The cap is inwardly concave to provide an upper pressure chamber 14 (FIG. 1) above a movable valve disk 15. The valve seat portion is centrally bored at 16, the bore or inlet port being in communication with an inlet passage 17, the gasket 13 being suitably apertured to permit such communication. Below the disk, there is a lower annular chamber 18 (FIGS. 2 and 3) which is open to an outlet port 19 and this outlet port in turn is in communication with an outlet passage 20.

This structure provides two concentric circular lands 21 and 22 the respective top surfaces of which lie in the same plane so as to be in planar contact with valve disk 15 when it is desired that the valve be closed to prevent cross flow from the inlet port 16 to the outlet port 19, as shown in FIG. 1. If pressure develops in inlet port 16, it will, under certain differential pressure conditions, raise valve disk 15, as will hereinafter appear.

The valve disk 15 is provided with two radial grooves 24 and 25, one on each of its opposite faces, one groove being deeper than the other. The groove on the lower face, in this case 25, is the presently active one, the groove 24 on the upper face becoming the active one if the disk is turned upside down. The purpose of the groove is to "bleed" air or inert gas from upper chamber 14, around the disk edge and through the active groove into annular chamber 18 and thence to exhaust port 19, and outlet passage 20. If this is not permitted warm air entering the upper chamber 14, along with steam, does not, of course, condense to liquid as steam does, so air pressure builds up above disk 14 and quickly brings closing pressure to bear on the disk so as to keep the disk in closed position, or at least retards its opening. The bleeder groove avoids this.

Under different valve operating conditions it may be desirable to provide a larger or smaller vent groove, or "bleeder" groove, in which case the design shown permits a change by reversal of the disk. More than one groove might be provided on each side. The user may determine the most proper air venting system for the specific application by observing the operation of the trap in service.

It will be noted that FIGURES 1 and 2 show the inlet port 16 as having tapered wall portions, flaring upwardly, the cross-sectional area of the inlet port increasing in the direction of upward flow through the valve seat. It has been found that use of an inlet port of this general type of design greatly increases the condensate capacity of the unit since the flashing of very hot condensate is prohibited, or retarded. A series of tests was conducted using thermodynamic steam traps constructed to be otherwise similar but with no change in the cross-sectional area of the inlet port through the valve seat. The steam system to which the traps were connected was operated at 35 pounds per square inch gauge steam pressure. After the system had had an opportunity of heating up, the temperature of the condensate at the entrance of the trap was approximately 30° below the saturation temperature of the steam within the system. The average condensate capacity of traps constructed in this manner was found to be 160 pounds per hour. The tests were repeated using steam traps designed in keeping with this invention with flared inlet ports installed on the same steam system. The temperature of the condensate at the inlet to the trap was substantially at the saturation temperature of the steam within the system indicating that the flow of condensate was not being restricted due to premature closing of the steam trap. The average condensate flow from the system with flared inlet port was approximately 310 pounds per hour.

It will be recognized that while the illustrations show a tapered wall inlet port other specific designs may be used. Manufacturing procedures, such as the use of grooved side walls for the inlet port throughout the valve seat, the use of serrated walls in the valve seat, or the use of several sudden increases in cross-sectional areas as obtained with boring tools rather than the smooth flared port wall would all accomplish the same results.

FIGS. 6 through 13 show optional changes in the inlet port by means of which we have obtained condensate discharge rates considerably increased over the rates obtainable in the prior art in steam traps of the thermodynamic type.

In FIGS. 6 and 7 the valve seat member **11*a* has a frusto conical inlet port 28 extending all the way to the seating plane of the valve disk, namely the plane of the lands 29 and 30**.

In FIGS. 8 and 9 the valve seat member **11*b* has a concave or hemispherical inlet port 31 connecting with the inlet passage 32**.

In FIGS. 10 and 11 the valve seat member **11*c* has an inlet port with a flared throat 33, inwardly convex, as shown, and communicating with the inlet passage 34**.

In FIGS. 12 and 13 the valve seat member **11*d*** has an inlet port formed by a succession of counterbored annular steps 35*a*, 35*b*, 35*c*, 35*d*, successively increasing in diameter in the order named.

In all of the embodiments hereinbefore described, the two more significant advantageous features are the movable valve disk having the bypass grooves permitting gradual relief of pressure from the upper pressure chamber, and the use of an inlet port at the inner terminus of the inlet chamber, said port being gradually increased in fluid carrying capacity as it approaches the movable valve disk. Another advantageous feature, of course, is the readily removable valve seat member which carries the inlet and outlet ports.

It has been found that when using the valve disk 15 with its bleeder grooves, the flared portion of the inlet port can be eliminated where a means is provided for creating a turbulence across the circular lands of the valve seat member. FIGS. 14 through 17 show two such forms of valve seat members, 11*e* and 11*f*.

In FIGS. 14 and 15 the valve seat member 11*e* has a nonflared inlet port 40 and a lower annular chamber 41. Said annular chamber is spaced radially outwardly from the port 40 a substantial distance thereby providing an inner circular land 42 which has a greater radial dimension than an outer circular land 43. The inner land 42 is provided with a plurality of circular, concentric grooves or serrations 44 which create a turbulence in the fluid passing from the inlet port 40 to the annular chamber 41, which said turbulence tends to prevent premature closing of the valve disk.

In FIGS. 16 and 17 another means for providing turbulence across the circular lands is illustrated. The valve seat member 11*f* has a nonflared inlet port 50 and a lower annular chamber 51 having a substantial radial dimension. A relatively narrow, inner circular land 52 surrounds the mouth of the inlet port 50, and a relatively narrow, outer circular land 53 defines the outer periphery of the chamber 51. A thin, annular baffle 54 is disposed concentrically within the chamber 51 intermediate the inner and outer peripheries thereof, said baffle having an upper edge 55 which is disposed a slight distance below said lands. The baffle 54 interrupts and creates a turbulence in the flow of fluid from the inlet port 50 to the chamber 51 thereby tending to prevent premature closing of the valve disk as set forth above.

In the last two embodiments described, the two more significant advantageous features are the movable valve disk having bypass grooves and the provision of turbulence forming means in the crossover area between the inlet port and the outlet chamber.

It will be understood that many changes in the details of the invention may be made without, however, departing from the spirit thereof or the scope of the appended claims.

What is claimed is:

1. A dynamic steam trap comprising a valve body having a valve chamber therein and respective inlet and outlet passages into and out of said valve chamber, an inlet port in a bottom wall of said chamber establishing communication between said inlet passage and said chamber, an outlet port in said bottom wall establishing communication between said chamber and said outlet passage, said inlet port having a fluid transmission area of increased fluid carrying capacity relative to the fluid carrying capacity of said inlet passage, a raised annular land providing a valve seat surrounding said inlet port, a second raised annular land providing a valve seat surrounding said outlet port, a valve disk in said valve chamber and seatable simultaneously on both said lands and adapted, when so seated, to prevent substantial fluid flow from said inlet port to said outlet port, but, when said valve disk is raised by fluid pressure entering said inlet port to permit condensate liquid to flow beneath said disk and out said outlet port, and a limited capacity vent from the valve chamber above and around said disk to said outlet port.

2. A steam trap as defined in claim 1 wherein said inlet port has a peripheral wall portion of frusto conical contour widening towards said valve chamber.

3. A steam trap as defined in claim 1 wherein said valve disk is adapted to be reversible, top for bottom, and wherein both opposed faces of said disk are provided with grooves, each extending a like distance from the peripheral edge of the disk to registry with said outlet port to provide respective limited capacity vents, one said groove having a venting capacity greater than the other said groove.

4. A steam trap as defined in claim 1 wherein the fluid transmission portion of the inlet port which has increased fluid carrying capacity is defined by a surrounding wall surface concaved and upwardly increasing in transverse area.

5. A steam trap as defined in claim 1 wherein the fluid transmission portion of the inlet port which has increased fluid carrying capacity is defined by a surrounding wall surface flaring upwardly in a smooth curve.

6. A steam trap as defined in claim 1 wherein the fluid transmission area of the inlet port which has increased carrying capacity has a frusto conical wall surface diverging all the way to said first land top surface.

7. A steam trap as defined in claim 1 wherein the fluid transmission area of the inlet port which has increased fluid carrying capacity is defined by a diverging peripheral wall increasing in transverse diameter in a progressive succession of steps towards said first land.

References Cited

UNITED STATES PATENTS

| | | | |
|---|---|---|---|
| 2,328,986 | 9/1943 | McKee | 137—183 |
| 2,817,353 | 12/1957 | Midgette | 137—183 |
| 3,150,677 | 9/1964 | Bochkoros | 137—183 |

FOREIGN PATENTS

| | | |
|---|---|---|
| 1,095,846 | 12/1960 | Germany. |
| 1,325,900 | 3/1963 | France. |

ALAN COHAN, *Primary Examiner.*